US012666187B2

(12) United States Patent
Luo et al.

(10) Patent No.: US 12,666,187 B2
(45) Date of Patent: Jun. 23, 2026

(54) MAGNETIC EAR TIP ATTACHMENT WITH POLARITY

(71) Applicant: APPLE INC., Cupertino, CA (US)

(72) Inventors: Geng Luo, Santa Clara, CA (US); Shota Aoyagi, San Francisco, CA (US); Timothy Emmott Torres, San Francisco, CA (US); Sarah B. Gysbers, Boulder, CO (US); Qigen Ji, Fairfield, CA (US)

(73) Assignee: APPLE INC., Cupertino, CA (US)

( * ) Notice: Subject to any disclaimer, the term of this patent is extended or adjusted under 35 U.S.C. 154(b) by 458 days.

(21) Appl. No.: 18/228,883

(22) Filed: Aug. 1, 2023

(65) Prior Publication Data

US 2024/0073576 A1 Feb. 29, 2024

Related U.S. Application Data

(60) Provisional application No. 63/374,104, filed on Aug. 31, 2022.

(51) Int. Cl.
*H04R 1/10* (2026.01)

(52) U.S. Cl.
CPC .................................. *H04R 1/1016* (2013.01)

(58) Field of Classification Search
CPC ..... H04R 1/1016; H04R 1/2819; H04R 1/105
See application file for complete search history.

(56) References Cited

U.S. PATENT DOCUMENTS

| | | | | |
|---|---|---|---|---|
| 7,311,526 | B2 | 12/2007 | Rohrbach et al. | |
| 7,436,974 | B2 | 10/2008 | Harper | |
| 7,658,613 | B1 | 2/2010 | Griffin et al. | |
| 9,118,990 | B2 | 8/2015 | Hankey et al. | |
| 9,167,329 | B2 | 10/2015 | Honeycutt | |
| 9,699,546 | B2 | 7/2017 | Qian et al. | |
| 10,097,913 | B2 | 10/2018 | Zorkendorfer et al. | |
| 10,237,640 | B2 | 3/2019 | Siahaan et al. | |
| 10,582,287 | B2 * | 3/2020 | Song | G06F 1/1681 |
| 10,986,433 | B2 | 4/2021 | McIntosh et al. | |
| 11,265,638 | B2 | 3/2022 | Trainer et al. | |
| 11,589,152 | B2 | 2/2023 | Trainer et al. | |
| 2009/0103760 | A1 * | 4/2009 | Stiehl | B29C 45/0025 381/371 |
| 2010/0166207 | A1 * | 7/2010 | Masuyama | H04R 1/1041 381/384 |
| 2010/0225430 | A1 | 9/2010 | Fullerton et al. | |

(Continued)

*Primary Examiner* — Oyesola C Ojo
(74) *Attorney, Agent, or Firm* — Kilpatrick Townsend & Stockton LLP

(57) ABSTRACT

An in-ear headphone that includes a device housing that defines an interior cavity; a primary acoustic port formed through the device housing; an acoustic driver disposed within the device housing and aligned to emit sound through the primary acoustic port; a deformable ear tip having a sound channel formed through its length and coupled to the device housing such that the sound channel is aligned with the primary acoustic port; and a magnetic alignment system comprising a first set of magnets coupled to the device housing and a second set of magnets coupled to the deformable ear tip, the magnetic alignment system configured to removably couple the deformable ear tip to the device housing and align the ear tip so that it can only be coupled to the device housing in a single orientation.

17 Claims, 9 Drawing Sheets

(56) References Cited

U.S. PATENT DOCUMENTS

| | | | | |
|---|---|---|---|---|
| 2012/0070027 | A1* | 3/2012 | Ridler | H04R 1/1058 381/374 |
| 2013/0092470 | A1* | 4/2013 | Johnston | H04R 1/1016 181/129 |
| 2014/0000312 | A1* | 1/2014 | Nicolas | A44C 5/04 63/3.2 |
| 2014/0355809 | A1* | 12/2014 | Killion | H04R 1/1016 381/380 |
| 2017/0085988 | A1* | 3/2017 | Hardi | H04R 1/1008 |
| 2017/0093079 | A1* | 3/2017 | Wagman | A45C 11/00 |
| 2017/0094388 | A1* | 3/2017 | Huwe | H04R 1/1016 |
| 2020/0107110 | A1* | 4/2020 | Ji | H05K 5/0086 |
| 2022/0070571 | A1* | 3/2022 | Oommen | H04R 1/1058 |
| 2022/0217463 | A1 | 7/2022 | Panecki et al. | |
| 2023/0058747 | A1* | 2/2023 | Chenal | A61F 11/085 |

* cited by examiner

MAGNETIC EAR TIP ATTACHMENT WITH POLARITY

This present application claims priority to U.S. Provisional Patent Application No. 63/374,104, filed Aug. 31, 2022, entitled "Magnetic Ear Tip Attachment With Polarity," which is herein incorporated by reference in its entirety for all purposes.

BACKGROUND

Earphones are a type of portable listening device that is intended to be positioned substantially within a user's ear. They can be used with a wide variety of electronic devices such as portable media players, smart phones, tablet computers, laptop computers and stereo systems. Earphones, which can also be referred to as ear-fitting headphones, include both in-ear headphones and earbuds. In-ear headphones, which are sometimes referred to as canal phones, are small headphones that include a deformable ear tip or similar structure that is inserted in the ear canal itself. Earbuds are small headphones that fit within a user's outer ear facing the ear canal but do not include an ear tip or other structure that is inserted into the ear canal.

Despite the growing popularity of earphones, new and improved earphone designs are continuously being sought.

BRIEF SUMMARY

Various embodiments of the invention pertain to improved earphone designs. For example, some embodiments pertain to in-ear earphones that include an ear tip that is removably coupled to the earphone housing by first and second sets of magnets such that ear tip can only be attached to the device housing in a single orientation. Other embodiments pertain to an in-ear earphone that includes ear tip with a stability feature at a bottom portion of the ear tip in order to provide a more secure fit of the ear tip within a user's ear.

In some embodiments an in-ear headphone is provided that includes: a device housing that defines an interior cavity; a primary acoustic port formed through the device housing; an acoustic driver disposed within the device housing and aligned to emit sound through the primary acoustic port; and a deformable ear tip having a sound channel formed through its length and coupled to the device housing such that the sound channel is aligned with the primary acoustic port. The in-ear headphone can further include a magnetic alignment system that functions to magnetically couple and align the ear tip relative to the device housing so that the ear tip can only be attached to the device housing in a single orientation. The magnetic alignment system can include a first set of magnets coupled to the device housing and a second set of magnets coupled to the deformable ear tip that cooperate with the first set of magnets.

In various implementations, the in-ear headphone can include one or more of the following features. The first set of magnets can be mechanically attached to a surface of the device housing that encircles the primary acoustic port. The first set of magnets can include first and second magnets each of which has an outer surface facing the ear tip. The first magnet can have a first polarity at its outer surface and the second magnet can have a second polarity at its outer surface opposite the first polarity. The second set of magnets can include third and fourth magnets, each of which has an outer surface facing the speaker housing. The third magnet can have a first polarity at its outer surface and the fourth magnet can have a second polarity at its outer surface opposite the first polarity. Each magnet in the first set of magnets can be a cylindrical magnet. Each magnet in the second set of magnets can be a cylindrical magnet. Each magnet in the first set of magnets can be an arcuate magnet. Each magnet in the second set of magnets can be an arcuate magnet. Each magnet in the first and second set of magnets can be a rare earth magnet.

In some embodiments, an in-ear headphone is provided that includes: a device housing that defines an interior cavity; a primary acoustic port formed through the device housing; an acoustic driver disposed within the device housing and aligned to emit sound through the primary acoustic port; a first set of magnets mechanically affixed to the device housing at a location adjacent to the primary acoustic port, the first set of magnets including at least first and second magnets each of which has a monolithic structure, the first magnet having a single magnetic region with a first magnetic polarity aligned perpendicular to an outer surface of the first magnet and the second magnet having a single magnetic region with a second magnetic polarity, opposite the first magnetic polarity, aligned perpendicular to an outer surface of the second magnet; a deformable ear tip having a sound channel formed through its length and coupled to the device housing such that the sound channel is aligned with the primary acoustic port; and a second set of magnets coupled to the deformable ear tip at a location adjacent to the sound channel, the second set of magnets including at least third and fourth magnets each of which has a monolithic structure, the third magnet having a single magnetic region with a first magnetic polarity aligned perpendicular to an outer surface of the third magnet and the fourth magnet having a single magnetic region with a second magnetic polarity, opposite the first magnetic polarity, aligned perpendicular to an outer surface of the fourth magnet. The deformable ear tip can be configured to be removably coupled to the device housing by the first and second sets of magnets and the first and second sets of magnets can be positioned such that the deformable ear tip can only be coupled to the device housing in a single orientation.

In some embodiments, an in-ear headphone is provided that includes: a device housing that defines an interior cavity; a primary acoustic port formed through the device housing; an acoustic driver disposed within the device housing and aligned to emit sound through the primary acoustic port; a deformable ear tip having an attachment end and an ear interfacing end, opposite from the attachment end, an anchor disposed between inner ear tip wall and the outer ear tip wall, the anchor configured to, when the ear tip is inserted into the ear canal, generate a force in a direction of the sound channel; and an alignment system that allows the deformable ear tip to be removably coupled to the device housing in a single orientation such that the anchor is positioned at a bottom portion of the ear tip when the ear tip is inserted into the ear canal. In various implementations, the deformable ear tip can include an inner ear tip wall extending between the ear interfacing end and the attachment end; a deformable outer ear tip wall sized and shaped to be inserted into an ear canal and extending from the ear interfacing end toward the attachment end of the ear tip. The anchor can include a leaf spring coupled to the inner ear tip wall. The anchor can be a rigid plastic structure co-molded with the inner ear tip wall. The anchor can be made from the same material as the outer ear tip wall. The inner ear tip wall, outer ear tip wall and anchor can be a monolithic structure. The anchor can be coupled to the inner ear tip wall and extend away from the inner ear tip wall toward the outer ear tip wall. The anchor can be coupled to the outer ear tip wall and extend away from the outer ear tip wall towards the inner ear tip wall.

In some embodiments, a deformable ear tip that has an attachment end and an ear interfacing end, opposite from the attachment end, is provided. The deformable ear tip can include: an inner ear tip wall extending between the ear interfacing end and the attachment end; a deformable outer ear tip wall sized and shaped to be inserted into an ear canal and extending from the ear interfacing end toward the attachment end of the ear tip; and an anchor coupled between the inner ear tip wall and extending away from the inner ear tip wall toward the outer ear tip wall, the anchor configured to, when the ear tip is inserted into a user's ear canal, generate a force in a direction of the sound channel.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Anatomy of a Human Ear

Figure 1:
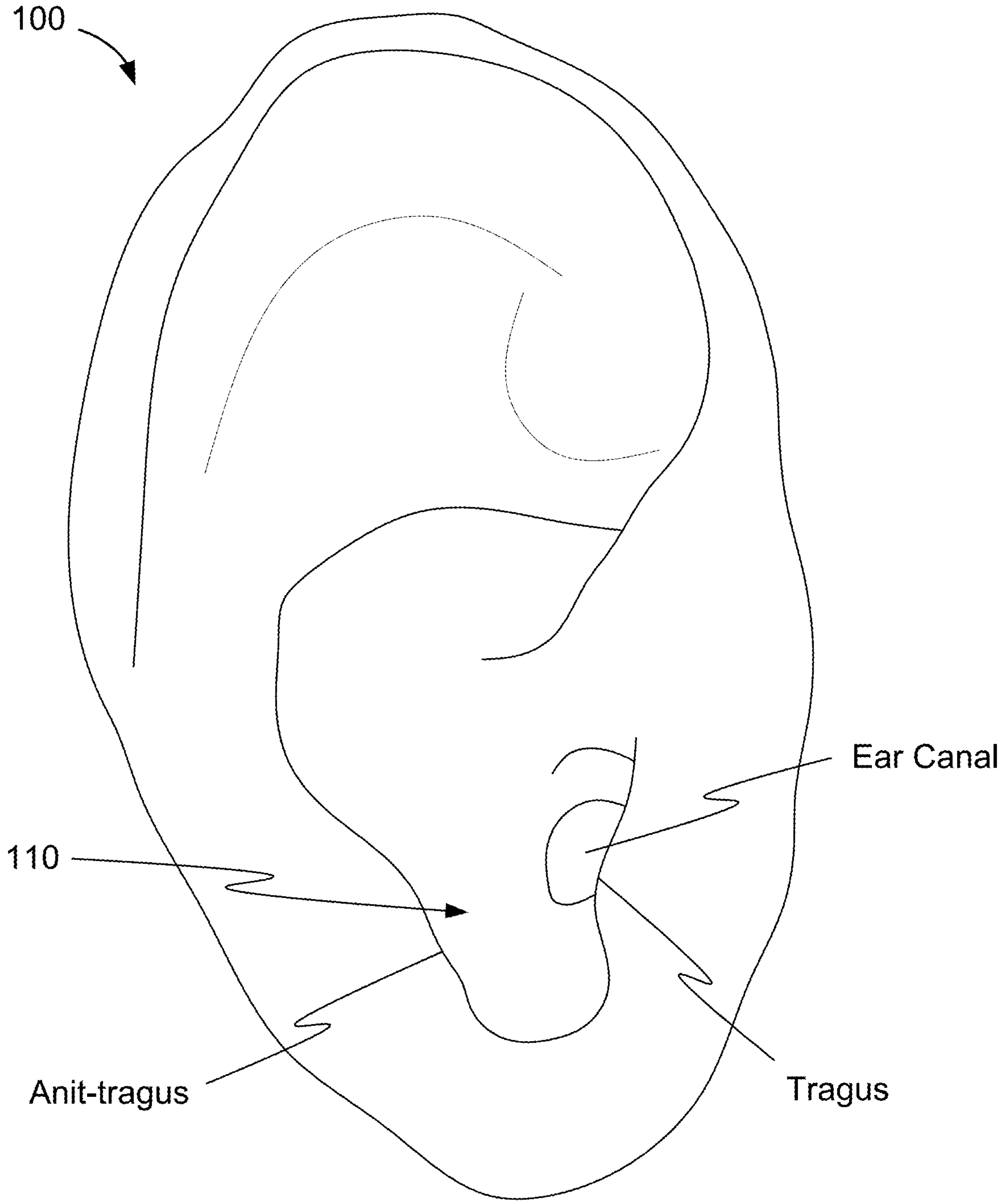
FIG. 1 is a simplified lateral view illustration of a human ear into which in-ear headphones according to embodiments disclosed herein can be fit.

In order to better appreciate and understand the present invention, reference is first made to FIG. 1, which is a simplified lateral view illustration of a typical human ear 100 into which in-ear headphones according to embodiments disclosed herein can be fit. As shown in FIG. 1, human ear 100 includes a targus portion and an anti-targus portion in an opposing relationship on opposite sides of the ear canal. In this typical human ear 100, the targus and anti-targus define a channel 110 adjacent to the ear canal. Earphones, such as in-ear headphones, generally include a housing that is sized and shaped to fit within the volume neighboring channel 110 such that the housing fits within and is secured between the tragus and anti-tragus and the ear tip extends into the ear canal.

The actual size and shape of the ear canal, however, can vary greatly between different individuals. In order to provide an improved fit, some in-ear headphones allow for different sized and/or shaped ear tips to be attached to the earphone body. A user can then try different sized and/or different shaped ear tips and determine which fits best within his or her ear canal.

In-Ear Headphones

Figure 2A:
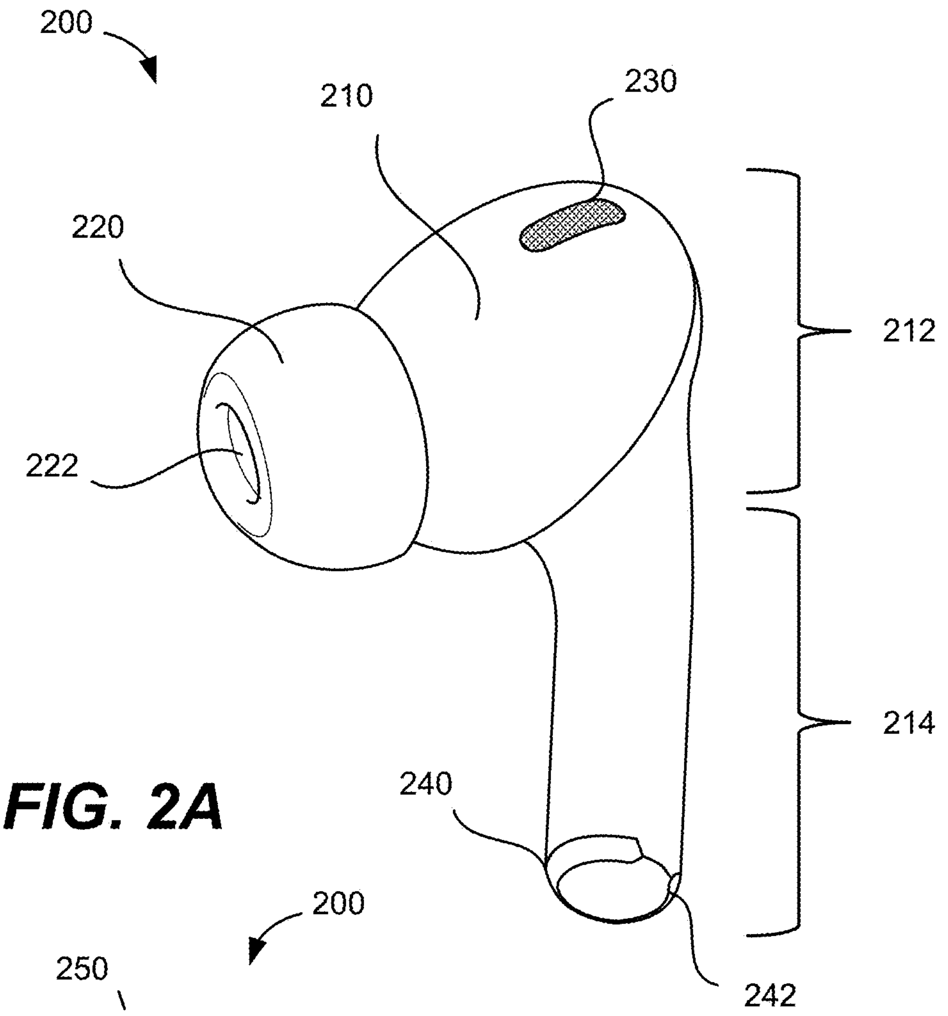
FIG. 2A is a simplified perspective view of an in-ear headphone according to some embodiments.

FIG. 2A is a simplified perspective view of an example of an in-ear headphone 200 according to some embodiments. Earphone 200 includes a housing 210 and an ear tip 220 that can direct sound from an internal audio driver (e.g., a speaker) out of housing 210 and into a user's ear canal. Housing 210 can be made from, for example, a hard radio frequency (RF) transparent plastic such as acrylonitrile butadiene styrene (ABS) or polycarbonate. In some embodiments, housing 210 can be made from one or more components that can be bonded together (e.g, with tongue and groove joints and an appropriate adhesive) to form a monolithic housing structure with a substantially seamless appearance.

In some embodiments housing 210 can be formed of a seemingly monolithic outer structure without any obvious seams or rough edges. Housing 210 can form a shell that defines an interior cavity (not shown) in which the various components of earphone 200 are positioned. For example, enclosed within housing 210 can be a processor or other type of controller, one or more computer-readable memories, wireless communication circuitry, an antenna, a rechargeable battery, power receiving circuitry and various sensors, such as an accelerometer, a photodetector, force and touch sensors and the like, none of which are shown in any of FIG. 2A. Housing 210 can also house an audio driver (i.e., a speaker) and one or more microphones. The speaker and one or more microphones can each be positioned within housing 210 at locations adjacent to audio openings that extend through housing 210 to allow the speaker and the one or more microphones to transmit and receive audio waves through the housing.

As depicted, housing 210 includes a speaker housing 212 and a stem 214 extending from the speaker housing 212 at an angle. The speaker housing 212 portion of housing 210 is sized and shaped to fit within and be secured behind channel 110 by the tragus and anti-tragus. In the depicted embodiment, speaker housing 212 can have a generally ovular shape that enables the speaker housing to be fit securely within channel 110.

Figure 2B:
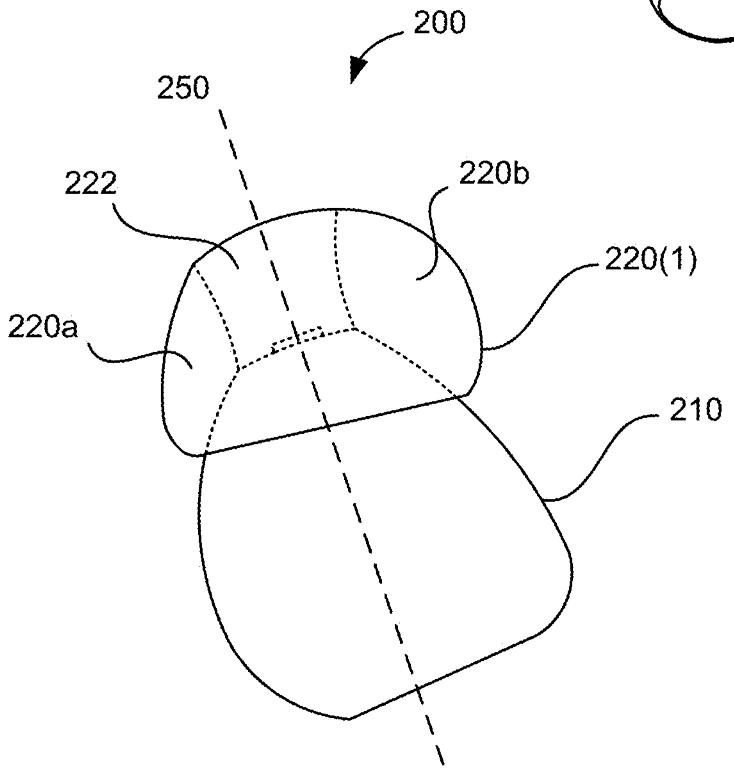
FIG. 2B is a simplified top view of the in-ear headphone shown in FIG. 2A according to some embodiments.

Speaker housing 212 defines a primary acoustic port (not visible in FIG. 2) and can include one or more additional audio ports, such as base port and a control leak. Some or all of such audio openings can be covered by a mesh. For example, as shown in FIG. 2A, a mesh 230 can be disposed over vent formed through speaker housing 212. The vent can be acoustically coupled to a back volume of the speaker housing to provide improved acoustic performance of the earphone.

In some embodiments stem 214 can be substantially cylindrical in construction along a portion of its length and can include a planar region (not shown) that does not follow the curvature of the cylindrical construction. While not shown, the planar region can indicate an area where in-ear headphone 200 is capable of receiving user input. For instance, a user input can be inputted by squeezing the stem at the planar region or sliding a finger along a portion of the planar region. Stem 214 can also include electrical contacts 240 and 242 for making contact with corresponding electrical contacts in charging case that can store and charge a pair of in-ear headphones 200. Electrical contacts 240, 242 provide a physical interface that can be electrically coupled with corresponding electrical contacts in a corresponding charging case. It is to be understood that embodiments are not limited to the particular shape and format of the housing 210 depicted in FIG. 2A. For example, in some embodiments the housing does not include a stem or similar structure and in some embodiments an anchor or other structure can be attached to or extend away from the housing to further secure the earbud to a feature of the user's ear.

Ear tip 220 can be removably coupled to speaker housing 212 so that different ear tips 220 can be tried and/or used by a user with earphone 200. Ear tip 220 can include an outer surface made primarily from a deformable material and can be sized and shaped to fit within a user's ear canal. For example, ear tip 220 can be inserted within the ear canal and can direct the received sound into the ear canal. Sound can be directed into the user's ear canal through a sound channel 222 that, when the ear tip is attached to the speaker housing, is aligned with the primary acoustic port of the earphone 200 to receive sound emitted by the audio driver.

As mentioned above, different uses can have ear canals that vary in both size and shape. In order to accommodate different users and provide an improved fit for all users, earphones 200 according to embodiments disclosed herein can be used with ear tips 220 of different sizes and/or different shapes. In some instances, the ear tips 220 can have an asymmetrical shape. As an example, reference is made to FIG. 2B, which is a simplified top view of in-ear headphone 200 shown in FIG. 2A with an ear tip 220(1) coupled to the earphone.

As shown, an axis 250 bisects the sound channel 222 of ear tip 220(1). In the depicted embodiment, the left portion **220*a* of ear tip 220(1) can be smaller than the right portion 220*b*. Ear tip 220(1)** has this particular asymmetric shape to enable the ear tip to better fit within ear canals that have a complementary asymmetric shape.

It is to be understood that the particular asymmetric shape of ear tip 220(1) is just one of many different asymmetrical shapes that other ear tips 220 can have. Other ear tips 220 that can be removably attached to speaker housing 212 can have different asymmetric shapes, can be symmetrically shaped and/or be smaller or larger than ear tip 220(1). Additionally, in some embodiments, the asymmetric nature of an ear tip 220 can be in the form of asymmetry in material properties in addition to, or instead of, asymmetry in shape. For example, in some embodiments, an ear tip 220 can be firmer on the inside portion (e.g., side) of the ear tip in order to better "hooking" or stability in fit, and softer on an outside portion (e.g., side) of the ear tip for improved contact comfort.

Ear Tip Magnetic Alignment System

As can be appreciated, the asymmetric shape of ear tip 220(1) is intended to be inserted into the ear canal of a user in a particular orientation. It can also be appreciated that ear tip 220(1) can be, for example, ideally suited for the ear canal within a left ear of the user while an ear tip having an opposite asymmetrical arrangement might be ideally suited for the ear canal within the right ear of the same user. To accommodate the different sized and shaped ear tips while ensuring that the ear tips are coupled to speaker housing 212 in the intended orientation, embodiments disclosed herein include a magnetic alignment system in which a first set of magnets is coupled to speaker housing 212 and a second set of magnets is coupled to ear tip 220. When the ear tip is moved in position to be coupled to the speaker housing, the first and second sets of magnets can be aligned with and face each other. The polarity of the first and second sets of magnets can be selected such that ear tip can only be attached to (i.e., mated with) the speaker housing in one orientation. To illustrate, two different embodiments are discussed below. A first embodiment in which the speaker housing and ear tip include cylindrical magnets and a second embodiment in which the speaker housing and ear tip include arcuate magnets. It is to be understood that these two embodiments are depicted for illustrative purposes only and a person of skill in the art will recognize other magnetic alignment systems that can be incorporated into the earphone and ear tip to ensure that the ear tip is coupled to the housing in a single orientation. For example, some embodiments can include ring magnets in which a monolithic body is magnetized into a multiple pole pattern while other embodiments can include arrays of magnets. Additionally, the magnets can be made from either a rigid magnetic material or a flexible magnetic material, and in various embodiments the magnetic coupling in the alignment system can be magnet to magnet or magnet to a ferrous material (e.g., steel).

1. Ear Tip with Cylindrical Magnets

Figure 3:
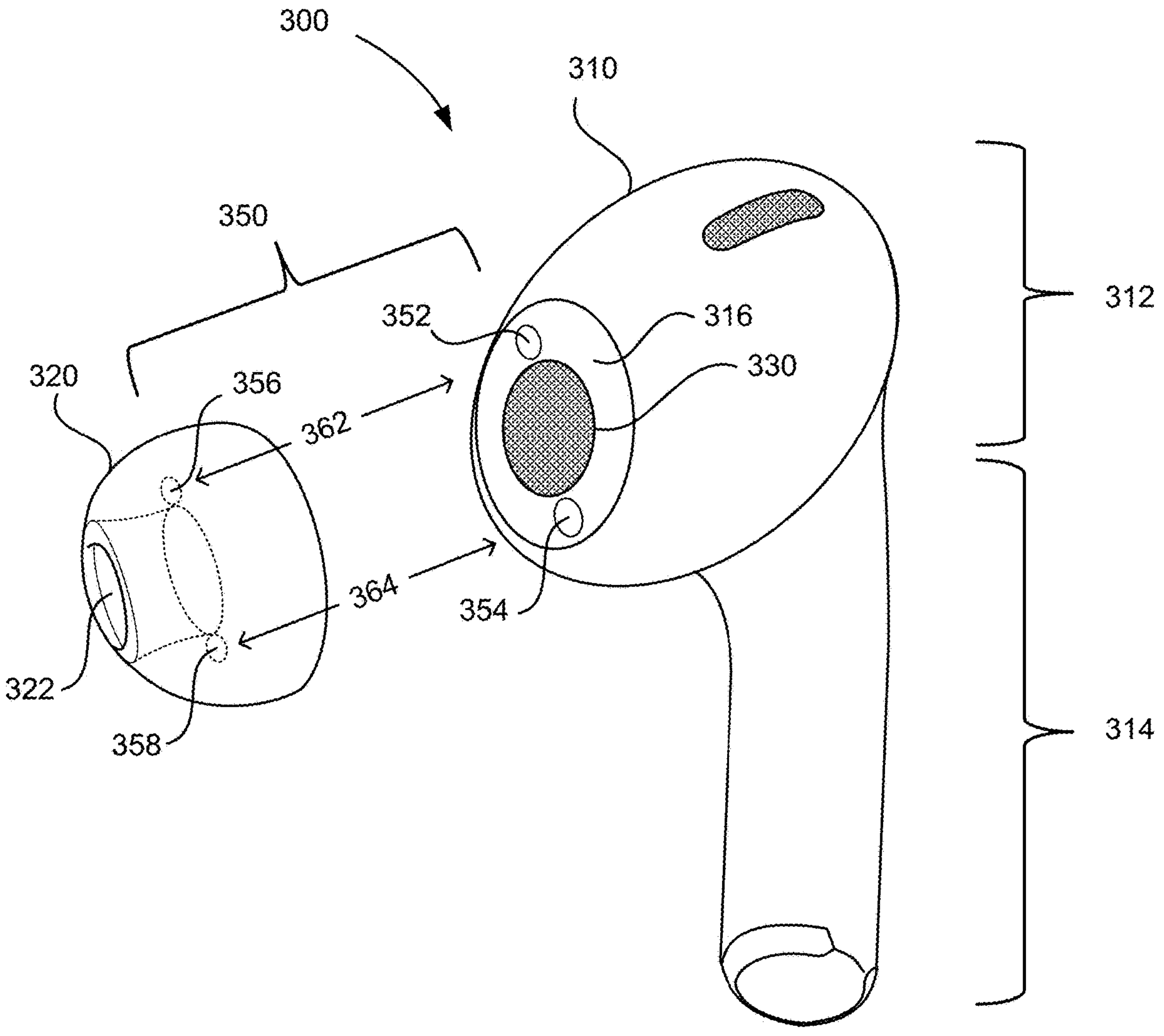
FIG. 3 is a simplified illustration of an in-ear headphone with a magnetically attached ear tip according to some embodiments.

FIG. 3 is a simplified illustration of an in-ear headphone 300. As shown in-ear headphone 300 includes housing 310 and a removable ear tip 320. In-ear headphone 300 can be representative of in-ear headphone 200 discussed above and include a speaker housing 312 and a stem 314 that are similar or identical to speaker housing 212 and stem 214. Ear tip 320 can be similar to ear tip 220 and include a deformable outer surface and a sound channel 322 that extends through a central portion of the ear tip. A mesh 330 can be coupled over the primary acoustic port of in-ear headphone 300 to protect the audio driver (not shown) and other internal components.

Ear tip 320 can be magnetically coupled to speaker housing 312 by a magnetic alignment system 350 that includes a first set of magnets 352, 354 coupled to speaker housing 312 and a second set of magnets 356, 358 coupled to ear tip 320. As depicted, in some embodiments each of the magnets 352, 354, 356, 358 can be a cylindrical magnet but embodiments are not limited to any particular shape of the magnets 352, 354, 356, 358 and in other embodiments each of the magnets can have a rectangular, square, oval or any appropriate shape.

Magnets 352, 354, 356, 358 can be made of a magnetic material such as an NdFeB material, other rare earth magnetic materials, or other materials that can be magnetized to create a persistent magnetic field. In some embodiments, the magnets can be plated with a thin protective layer that provides protection against scratches and corrosion. Each of the magnets 352, 354, 356, 358 can have a monolithic structure having a single magnetic region with a magnetic polarity aligned perpendicular to an outer surface of the magnet.

The first set of magnets 352, 354 can be mechanically affixed to a surface 316 of speaker housing 312 that encircles the primary acoustic port. Surface 316 can be a generally planar surface that faces ear tip 320. In some embodiments, magnets 352, 354 can be positioned within small cavities formed within surface 316 (e.g., small holes drilled into surface 316 or formed when portions of housing 310 are formed by an insert molding process). The second set of magnets 356, 358 can be mechanically affixed to a portion of deformable ear tip 320 adjacent to and outside of sound channel 322 or embedded within a portion of the ear tip that defines the sound channel. While not shown, in some embodiments, magnetic alignment system can also include one or more structural features that help to physically align ear tip 320 with the speaker housing. For example, a ridge or color can be formed along surface 316 of the speaker housing that is aligned to accept an inner portion of ear tip 320.

Magnets 352, 354 can be arranged such the outer surface of magnet 352 facing ear tip 320 has an opposite polarity from the outer surface of magnet 354 facing ear tip 320. For example, magnet 352 can have its north pole facing ear tip 320 while magnet 354 can have its south pole facing ear tip 320. Similarly, magnets 356, 358 can be arranged such the outer surface of magnet 356 facing speaker housing 312 has an opposite polarity from the outer surface of magnet 358 facing speaker housing 312. For example, magnet 356 can have its south pole facing speaker housing 312 while magnet 358 can have its north pole facing speaker housing 312. In this manner, magnets 352 and 356 exert an attractive force 362 towards each other while magnets 354 and 358 can exert an attractive force 364 towards each other. The combined attractive forces 362, 364 can properly align and secure ear tip 320 to speaker housing 312 during normal use of in-ear headphone 300. In some embodiments, the magnets 356, 358 can be embedded within the deformable material that ear tip 320 is made from such that a thin layer of the deformable material is positioned between pairs of mating magnets 352, 356 and 354, 358 when ear tip 320 is operatively coupled to the speaker housing.

Once ear tip 320 is mated or connected to the speaker housing, the ear tip can be separated from the speaker housing by rotating or twisting the ear tip either left or right with respect to the speaker housing to break the magnetic connection between the two sets of magnets. Magnetic alignment system 350 ensures that ear tip 320 can be coupled to speaker housing 312 in just one orientation. If the ear tip is attempted to be coupled to the speaker housing such that magnet 358 of ear tip 320 is moved towards magnet 352 of speaker housing 312 and magnet 356 of ear tip 320 is moved toward magnet 354 of speaker housing 312, the magnets will repel each other as magnets 358 and 352 both have north poles at their outer surfaces while magnets 356 and 354 both have south poles at their outer surfaces.

While FIG. 3 depicts magnetic alignment system 350 as including two magnets coupled to the speaker housing and two magnets coupled to the ear tip, embodiments are not limited to any particular number of magnets. Other embodiments can include more than two magnets coupled to each of the device housing and ear tip provided the magnets cooperate with each other to enable the ear tip to be coupled to the device housing in just a single orientation.

2. Ear Tip with Arcuate Magnets

Figure 4:
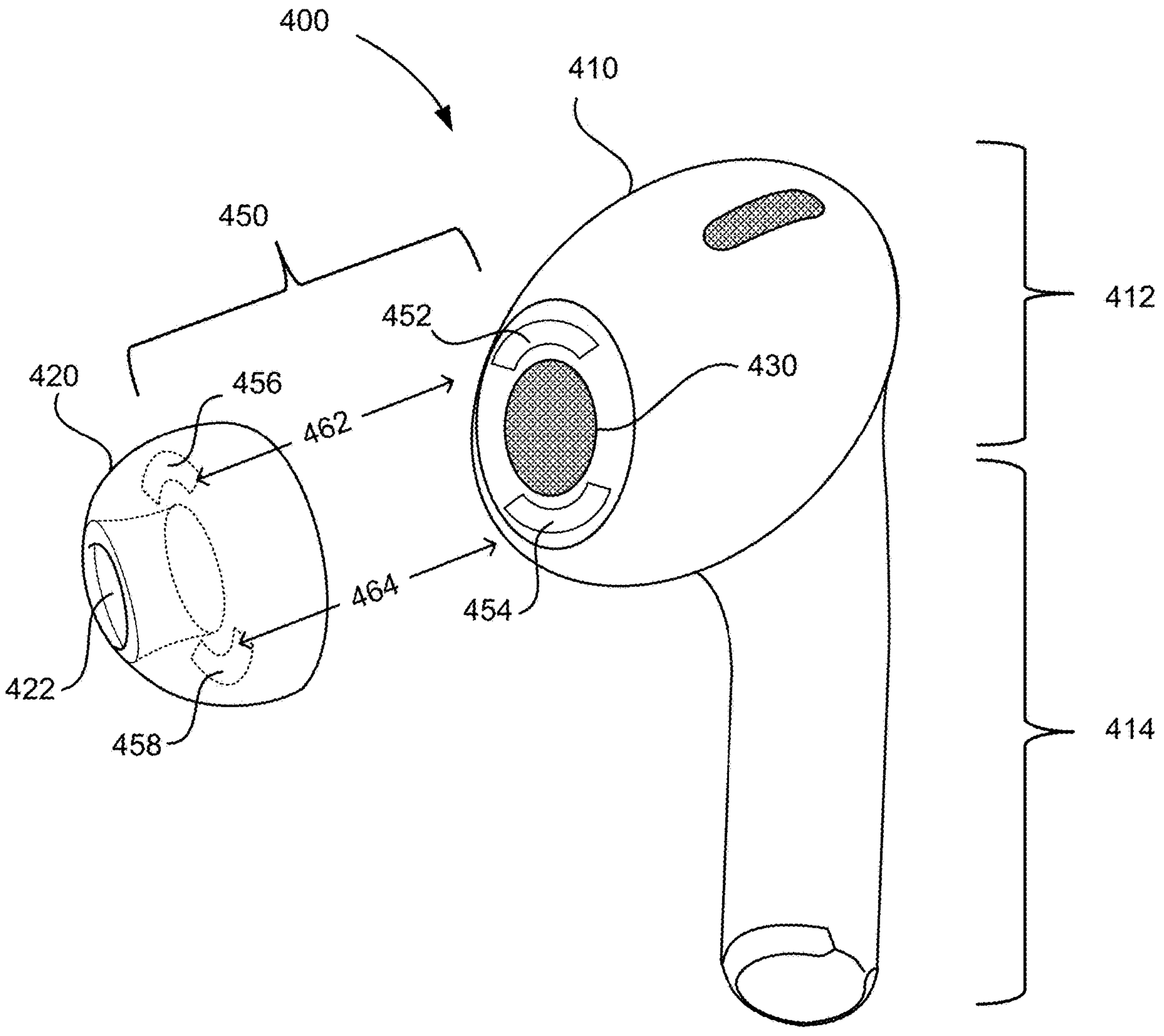
FIG. 4 is a simplified illustration of an in-ear headphone with a magnetically attached ear tip according to some additional embodiments.

FIG. 4 is a simplified illustration of an in-ear headphone 400. As shown in-ear headphone 400 includes housing 410 and a removable ear tip 420. In-ear headphone 400 can also be representative of in-ear headphone 200 discussed above and include a speaker housing 412 and a stem 414 that are similar or identical to speaker housing 412 and stem 414. Ear tip 420 can be similar to ear tip 220 and include a deformable outer surface and a sound channel 422 that extends through a central portion of the ear tip. A mesh 430 can be coupled over the primary acoustic port of in-ear headphone 400 to protect the audio driver (not shown) and other internal components.

Ear tip 420 can be magnetically coupled to speaker housing 412 by a magnetic alignment system 450 that includes a first set of magnets 452, 454 coupled to speaker housing 412 and a second set of magnets 456, 458 coupled to ear tip 420. As depicted, in some embodiments each of the magnets 452 and 454 can have an arcuate shape that partially surrounds the primary acoustic port while each of magnets 456 and 458 can have an arcuate shape and be positioned to partially surround sound channel 422.

Similar to magnets 352, 354, 356, 358, each of magnets 452, 454, 456, 458 can be made of a magnetic material such as an NdFeB material, other rare earth magnetic materials, or other materials that can be magnetized to create a persistent magnetic field. In some embodiments, the magnets can be plated with a thin protective layer that provides protection against scratches and corrosion. Each of the magnets 452, 454, 456, 458 can be a bar magnet that has been ground and shaped into an arcuate structure and can be a monolithic structure with a single magnetic region having a magnetic polarity aligned perpendicular to an outer surface of the magnet.

The first set of magnets 452, 454 can be mechanically affixed to a surface 416 of speaker housing 412 that encircles the primary acoustic port. Surface 416 can be a generally planar surface that faces ear tip 420. In some embodiments, magnets 452, 454 can be positioned within small cavities formed within surface 416 (e.g., small holes drilled into surface 416 or formed when portions of housing 410 are formed by an insert molding process). The second set of magnets 456, 458 can be mechanically affixed to a portion of deformable ear tip 420 adjacent to and outside of sound channel 422 or embedded within a portion of the ear tip that defines the sound channel.

Magnets 452, 454 can be arranged such the outer surface of magnet 452 facing ear tip 420 has an opposite polarity from the outer surface of magnet 454 facing ear tip 420. For example, magnet 452 can have its north pole facing ear tip 420 while magnet 454 can have its south pole facing ear tip 420. Similarly, magnets 456, 458 can be arranged such the outer surface of magnet 456 facing speaker housing 412 has an opposite polarity from the outer surface of magnet 458 facing speaker housing 412. For example, magnet 456 can have its south pole facing speaker housing 412 while magnet 458 can have its north pole facing speaker housing 412. In this manner, magnets 452 and 456 exert an attractive force 462 towards each other while magnets 454 and 458 can exert an attractive force 464 towards each other. The combined attractive forces 462, 464 can properly align and secure ear tip 420 to speaker housing 412 during normal use of in-ear headphone 400. In some embodiments, the magnets 456, 458 can be embedded within the deformable material that ear tip 420 is made from such that a thin layer of the deformable material is positioned between pairs of mating magnets 452, 456 and 454, 458 when ear tip 420 is operatively coupled to the speaker housing.

To separate ear tip 420 from the speaker housing, the ear tip can be rotated or twisted either left or right with respect to the speaker housing to break the magnetic connection between the two sets of magnets. Magnetic alignment system 450 ensures that ear tip 420 can be coupled to speaker housing 412 in just one orientation. If the ear tip is attempted to be coupled to the speaker housing such that magnet 458 of ear tip 420 is moved towards magnet 452 of speaker housing 412 and magnet 456 of ear tip 420 is moved toward magnet 454 of speaker housing 412, the magnets will repel each other as magnets 458 and 452 both have north poles at their outer surfaces while magnets 456 and 454 both have south poles at their outer surfaces.

While FIG. 4 depicts magnetic alignment system 450 as including two magnets coupled to the speaker housing and two magnets coupled to the ear tip, embodiments are not limited to any particular number of magnets. Other embodiments can include more than two magnets coupled to each of the device housing and ear tip provided the magnets cooperate with each other to enable the ear tip to be coupled to the device housing in just a single orientation. Additionally, magnetic alignment system need not be limited to arcuate magnets. For example, in some embodiments, magnetic alignment system 450 can include a pair of arcuate magnets and a pair of cylindrical magnets coupled to each of the device housing and the ear tip.

Ear Tip with Stability Anchor

Figure 5:
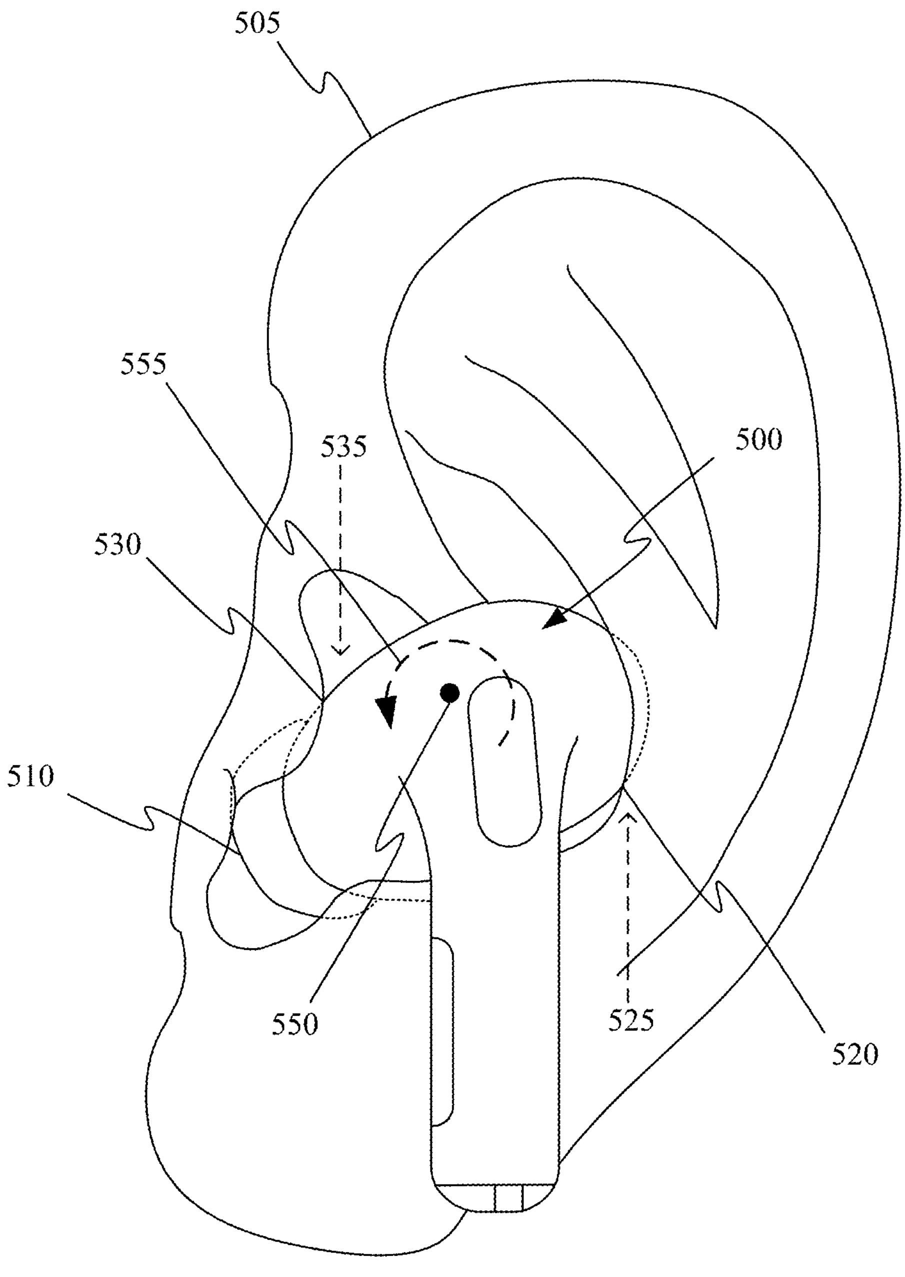
FIG. 5 is a simplified illustration depicting an earphone according to some embodiments positioned within a user's ear.

Ear tips according to some embodiments include a stability feature (sometimes referred to herein as a "stability anchor") at a bottom portion of the ear tip in order to provide a more secure fit of the ear tip within a user's ear. To illustrate the benefits of such a stability feature, reference is first made to FIG. 5, which is a simplified illustration depicting an earphone 500 positioned within a user's ear 505. As shown, earphone 500 contacts ear 505 in three primary regions: a region 510 in which a deformable ear tip of earphone 500 is inserted into the ear canal, a region 520 at a first portion of an exterior surface of earphone 500, and a region 530 at a second portion of the exterior surface of earphone 500.

These three contact areas create three separate forces that act together to secure earphone 500 within ear 505. Specifically, the deformable ear tip can squeeze into the ear canal creating a friction fit between ear 505 and the ear tip while regions 520 and 530 impart an upward force 525 and a downward force 535, respectively, against the earphone 500.

The forces 525, 535 create a pivot point 550. The forces 525, 535 can change over time when, for example, the user's facial expression changes (e.g., smiles, frowns, etc.), the changes poses (e.g., bends over) or undergoes physical activity (e.g, jogging, running, jumping, etc.). In some instances, the changing forces 525, 35 can create a moment that results in earphone 500 pivoting in direction 555 around pivot point 550 such that the fit of earphone 500 is less secure within ear 505, or in extreme cases, earphone 500 can become dislodged. The potential for earphone 500 to become dislodged can be particularly problematic for user's who have a smaller concha length, a steep concha slope and/or a raised anti-tragus.

Figure 6:
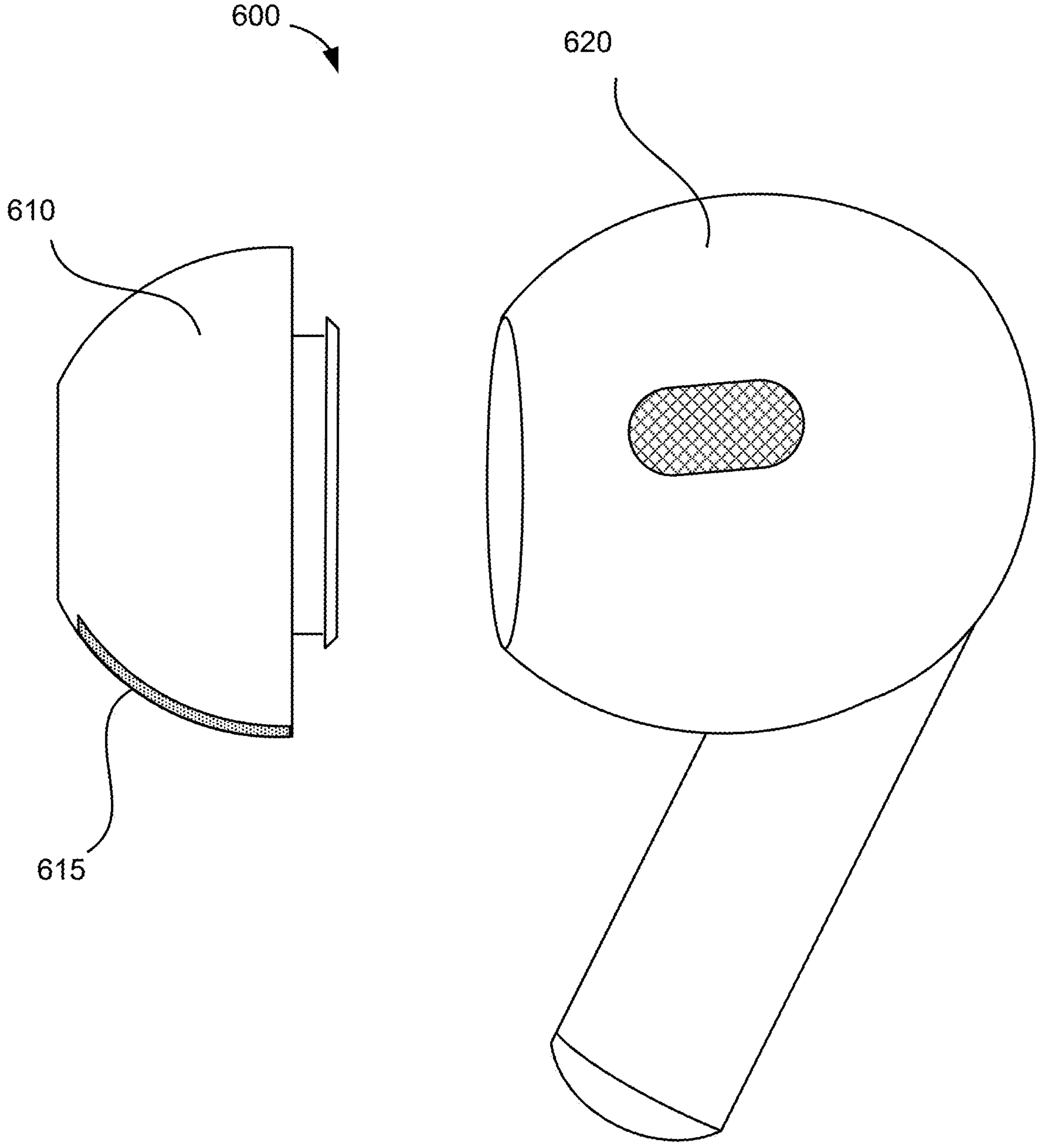
FIG. 6 is a simplified illustration of an earphone that includes a deformable ear tip according to some embodiments
Figure 7:
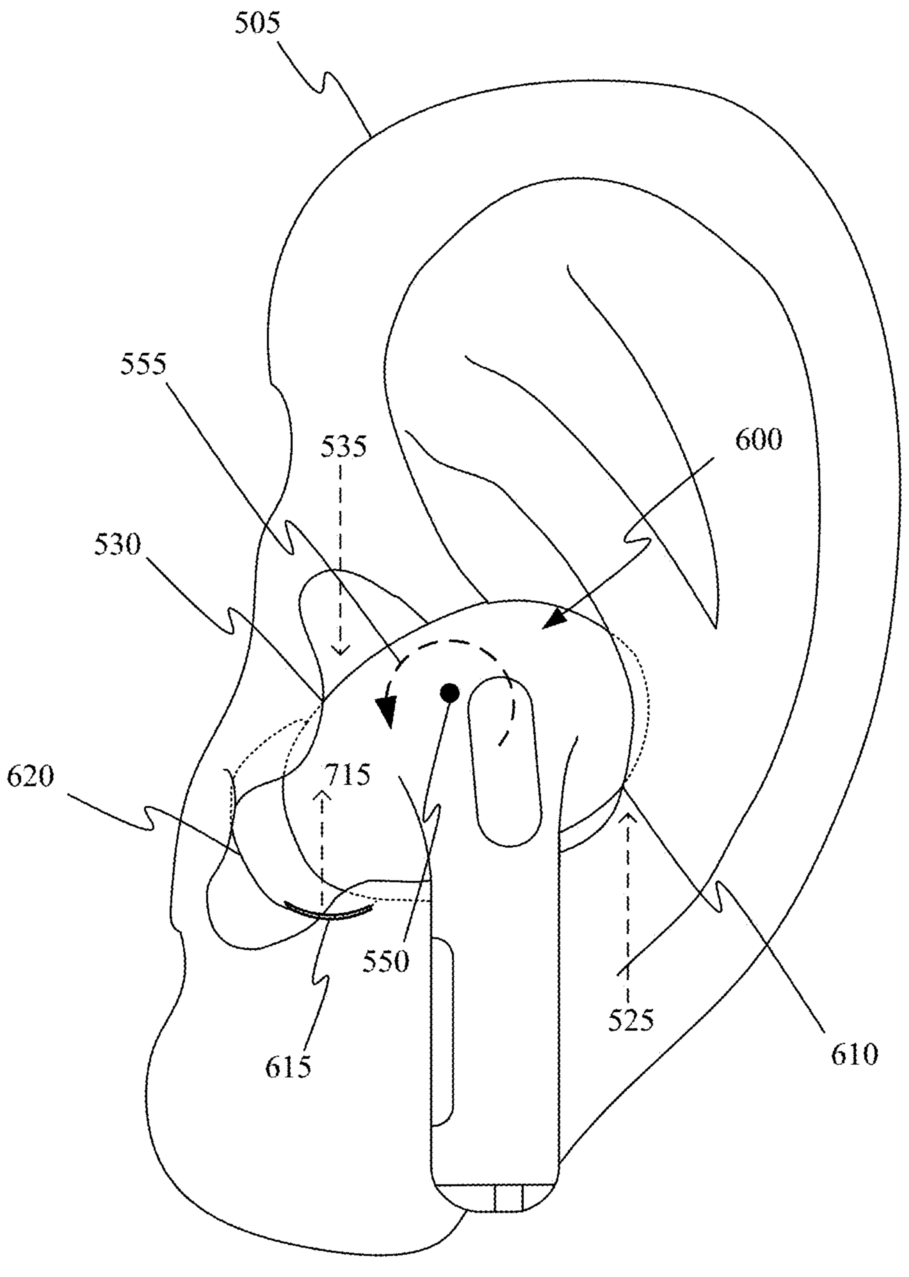
FIG. 7 is a simplified illustration depicting the earphone of FIG. 6 positioned within a user's ear.

FIG. 6 is a simplified illustration of an earphone 600 that includes a deformable ear tip 610 according to some embodiments. Ear tip 610 is pictured in FIG. 6 spaced apart from a body 620 of earphone 600 such that ear tip 610 is detached from body 620. An ear tip according to some embodiments disclosed herein can include a physical structure 615 (sometimes referred to herein as an "anchor") at a bottom portion of a deformable ear tip, such as ear tip 610. The physical structure 615 can be disposed between the inner and outer ear tip walls and can apply an upward force that counteracts forces 525, 535 providing a counter moment in a direction opposite that of direction 555 (shown in FIG. 7, which is a simplified illustration depicting earphone 600 positioned within user's ear 505, as force 715) to better secure earphone 600 within the user's ear.

Since physical structure 615 is located at a bottom portion of ear tip 610, ear tip 610 can essentially have an asymmetric shape. Thus, in some embodiments earphone 600 includes an alignment system in order to ensure that ear tip 610 is correctly aligned with and attached to earphone body 620. The alignment system can be any of the magnetic alignment systems discussed above. Alternatively, the alignment system can include a mechanical feature (e.g., a key) or similar structure that ensure ear tip 610 is attached to earphone body 620 in the desired orientation such that physical structure 615 is located at a bottom portion of the ear tip when the ear tip is inserted within a user's ear. As still additional alternative, in some embodiments the alignment system can be a visual indicator (e.g., color coded surfaces of the ear tip) that visually inform a user the correct orientation angle of the ear tip with respect to the earphone body.

Figure 8A:
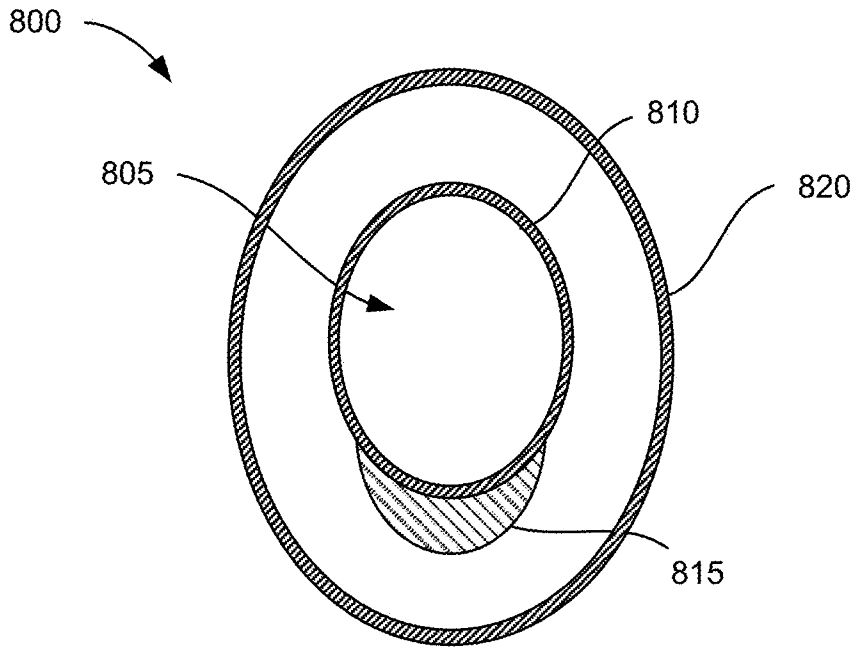
FIGS. 8A and 8B are simplified plan and cross-sectional views, respectively, of a deformable ear tip according to some embodiments.
Figure 8B:
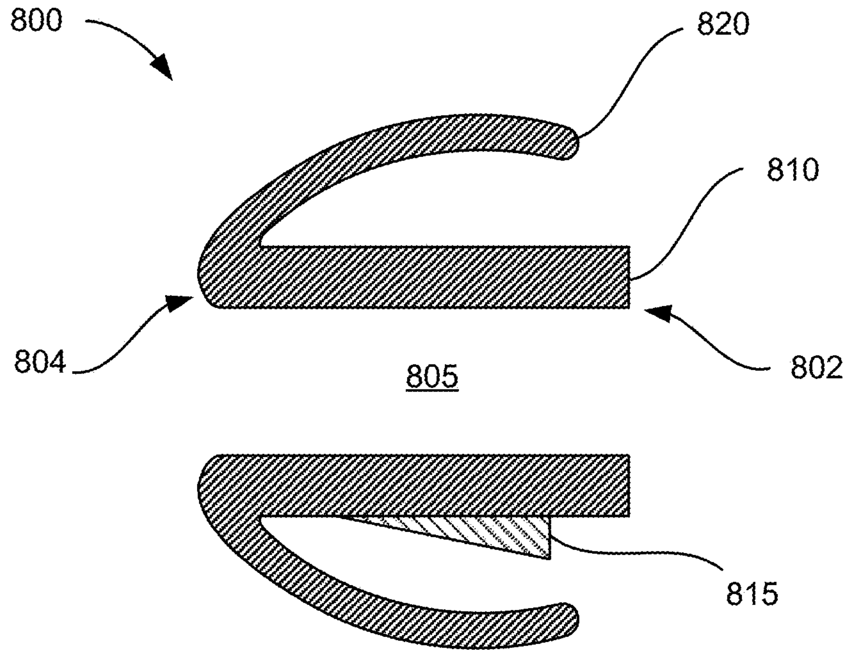

In various embodiments, physical structure 615 can be a leaf spring or rigid structure that contacts a portion of the user's ear within the ear canal generating upward force 715. As one example, reference is made to FIGS. 8A and 8B where FIG. 8A is a simplified plan view of a deformable ear tip 800 looking into the attachment end of the ear tip and FIG. 8B is a simplified cross-sectional view of ear tip 800. Ear tip 800 can be representative of an embodiment of ear tip 610 discussed above with respect to FIG. 6.

As shown in FIGS. 8A and 8B, ear tip 800 that can be coupled to an earphone body at an attachment end 802 and inserted into a user's ear canal at an ear-interfacing end 804. Ear tip 800 further includes an inner ear tip wall 810 that extends between attachment end 802 and ear interfacing end 804. The inner ear tip wall is surrounded by an outer ear tip wall 820 that extends from the ear interfacing end towards the attachment end. In some embodiments, inner ear tip wall 810 and outer ear tip wall 820 are part of a single monolithic structure.

Inner ear tip wall 810 defines a sound channel 805 and outer ear tip wall 820 defines an outer periphery of the ear tip that deforms upon contact with the ear canal of a user when ear tip 800 is inserted into a user's ear. Also shown in FIGS. 8A and 8B is a rigid portion 815 of the ear tip that represents an embodiment of physical structure (anchor) 615 discussed above. The extra thickness of rigid portion 815 creates the force 715 discussed above, which helps anchor an earphone that ear tip 800 is attached to within the user's ear by counteracting the forces 525, 535 that create pivot point 550.

In some embodiments, rigid portion 815 is a structure that is co-molded with ear tip wall 820 and made from a material (e.g., plastic or a relatively dense silicone or rubber) that is stiffer than that of the outer ear tip wall. In other embodiments, rigid portion 815 can be made from the same material (e.g., silicon or rubber) as ear tip wall 820 and formed as part of the same molding process as both inner wall 810 and outer wall 820.

Figure 9:
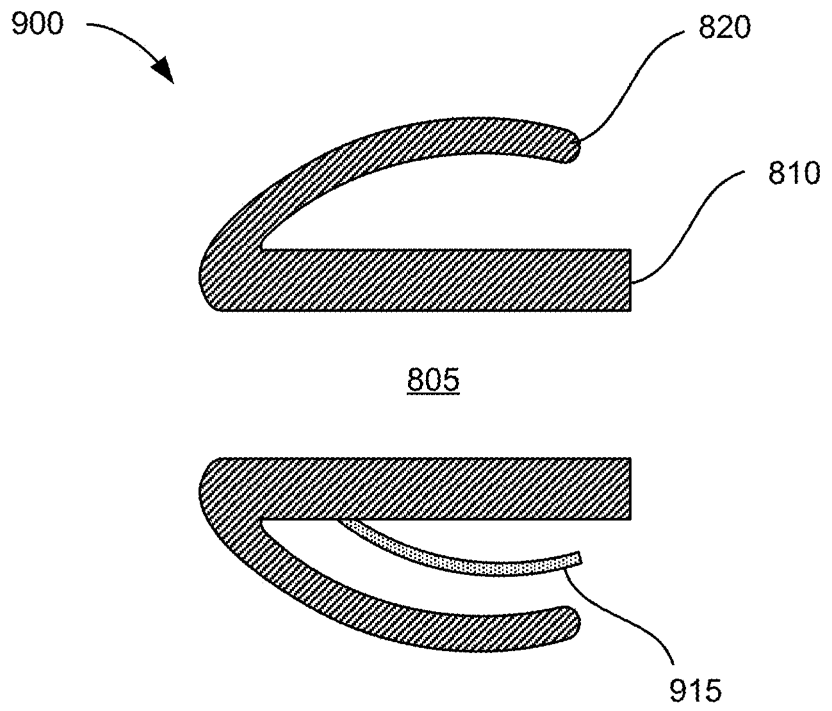
FIG. 9 is a simplified cross-sectional view of an ear tip according to some embodiments.

FIG. 9 is a simplified cross-sectional view of an ear tip 900 in accordance with another embodiment. Ear tip 900, which can be representative of an embodiment of ear tip 610 discussed above with respect to FIG. 6, includes many of the same features as ear tip 800, which for convenience have been labeled with the same reference number. Instead of including rigid structure 815, ear tip 900 includes a leaf spring 915 that extends away from inner ear tip wall 810. Leaf spring 915 can be biased to provide a outward facing force away from sound channel 805 such that when ear tip 900 is inserted into a user's ear canal with the leaf spring along a bottom portion of the ear tip, the leaf spring is compressed applying a force to the ear phone in direction 715, as discussed above, helping anchor the earphone within the user's ear by counteracting the forces 525, 535 which create pivot point 550. In some embodiments, leaf spring 915 can lie generally parallel to inner ear wall 810 when the ear tip is not in user and pivot outward, like a kickstand, into the position shown in FIG. 9 when subject to a force from insertion of the ear tip into a user's ear.

ADDITIONAL EMBODIMENTS

The foregoing description, for purposes of explanation, used specific nomenclature to provide a thorough understanding of the described embodiments. However, it will be apparent to one skilled in the art that the specific details are not required in order to practice the described embodiments. For example, while several specific embodiments are described above with respect to earbuds that include a stem portion (e.g., housing portions 214, 314 and 414) extending away from a speaker housing portion (e.g., housing portions 212, 312, 412) embodiments are not limited to earbuds having a stem portion or similar feature. In some embodiments, the earbud housing can comprise a single bulbous or similar housing structure that does not include a stem and thus does not include separate speaker housing and stem portions. As a matter of terminology, in such embodiments, the removable ear tip can be said to be removably coupled to the housing generally, but since the acoustic driver is positioned within the housing, the housing itself can be referred to as a speaker housing.

As additional examples, while FIGS. 8A, 8B and 9 depict an anchor that is coupled to the inner ear tip wall, in other embodiments the anchor can be coupled to the outer ear tip wall and in still other embodiments, the anchor can be a solid structure extending fully between the inner and outer ear tip walls. Also, while sound channel 805 was depicted in FIGS. 8A, 8B and 9 as having an ovular cross-sectional shape, embodiments are not limited to any particular shape of the sound channel and in other embodiments the sound channel can have a circular or other appropriate cross-sectional shape.

Thus, the foregoing descriptions of the specific embodiments described herein are presented for purposes of illustration and description. They are not intended to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. In various embodiments, the components of an earbud positioned within the internal cavity formed by the ear bud housing can be arranged differently than in the examples provided herein. As illustrative examples, any of the battery, wireless circuitry, processor, antenna, microphones and other components can be located in either the stem portion or the speaker housing portion. Further, it will be apparent to one of ordinary skill in the art that many modifications and variations are possible in view of the above teachings.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Finally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An in-ear headphone comprising:
- a device housing that defines an interior cavity;
- a primary acoustic port formed through the device housing;
- an acoustic driver disposed within the device housing and aligned to emit sound through the primary acoustic port;
- a deformable ear tip having a sound channel formed through its length and coupled to the device housing such that the sound channel is aligned with the primary acoustic port, the deformable ear tip comprising:
  - an inner ear tip wall extending between the ear interfacing end and the attachment end;
  - a deformable outer ear tip wall sized and shaped to be inserted into an ear canal and extending from the ear interfacing end toward the attachment end of the ear tip; and
  - an anchor disposed between the inner ear tip wall and the outer ear tip wall; and
- a magnetic alignment system comprising a first set of magnets coupled to the device housing and a second set of magnets coupled to the deformable ear tip, the magnetic alignment system configured to removably couple the deformable ear tip to the device housing and align the ear tip so that it can only be coupled to the device housing in a single orientation such that the anchor is positioned at a bottom portion of the ear tip when the ear tip is inserted into the ear canal of a user's ear and a force generated by the anchor counteracts moments about a pivot point created by forces exerted between the ear tip and the user's ear thereby providing a more secure fit of the ear tip within the ear canal.

2. The in-ear headphone set forth in claim 1 wherein the first set of magnets are mechanically attached to a surface of the device housing that encircles the primary acoustic port.

3. The in-ear headphone set forth in claim 2 wherein each magnet in the first set of magnets is a cylindrical magnet.

4. The in-ear headphone set forth in claim 3 wherein each magnet in the second set of magnets is a cylindrical magnet.

5. The in-ear headphone set forth in claim 3 wherein each magnet in the first set of magnets is an arcuate magnet.

6. The in-ear headphone set forth in claim 5 wherein each magnet in the second set of magnets is an arcuate magnet.

7. The in-ear headphone set forth in claim 1 wherein the first set of magnets includes first and second magnets each of which has an outer surface facing the ear tip, the first magnet having a first polarity at its outer surface and the second magnet having a second polarity at its outer surface opposite the first polarity.

8. The in-ear headphone set forth in claim 7 wherein the second set of magnets includes third and fourth magnets each of which has an outer surface facing the device housing, the third magnet having a first polarity at its outer surface and the fourth magnet having a second polarity at its outer surface opposite the first polarity.

9. The in-ear headphone set forth in claim 1 wherein each magnet in the first and second set of magnets is a rare earth magnet.

10. An in-ear headphone comprising:

a device housing that defines an interior cavity;

a primary acoustic port formed through the device housing;

an acoustic driver disposed within the device housing and aligned to emit sound through the primary acoustic port;

a first set of magnets mechanically affixed to the device housing at a location adjacent to the primary acoustic port, the first set of magnets including at least first and second magnets each of which has a monolithic structure, the first magnet having a single magnetic region with a first magnetic polarity aligned perpendicular to an outer surface of the first magnet and the second magnet having a single magnetic region with a second magnetic polarity, opposite the first magnetic polarity, aligned perpendicular to an outer surface of the second magnet;

a deformable ear tip having a sound channel formed through its length and coupled to the device housing such that the sound channel is aligned with the primary acoustic port, the deformable ear tip comprising:

an inner ear tip wall extending between the ear interfacing end and the attachment end;

a deformable outer ear tip wall sized and shaped to be inserted into an ear canal and extending from the ear interfacing end toward the attachment end of the ear tip; and an anchor disposed between the inner ear tip wall and the outer ear tip wall; and a second set of magnets coupled to the deformable ear tip at a location adjacent to the sound channel, the second set of magnets including at least third and fourth magnets each of which has a monolithic structure, the third magnet having a single magnetic region with a first magnetic polarity aligned perpendicular to an outer surface of the third magnet and the fourth magnet having a single magnetic region with a second magnetic polarity, opposite the first magnetic polarity, aligned perpendicular to an outer surface of the fourth magnet;

wherein the deformable ear tip is configured to be removably coupled to the device housing by the first and second sets of magnets and wherein the first and second sets of magnets are positioned such that the deformable ear tip can only be coupled to the device housing in a single orientation such that the anchor is positioned at a bottom portion of the ear tip when the ear tip is inserted into the ear canal of a user's ear and the force generated by the anchor counteracts forces moments about a pivot point created by forces exerted between the ear tip and the user's ear thereby providing a more secure fit of the ear tip within the ear canal.

11. An in-ear headphone comprising:

a device housing that defines an interior cavity;

a primary acoustic port formed through the device housing;

an acoustic driver disposed within the device housing and aligned to emit sound through the primary acoustic port;

a deformable ear tip having a sound channel formed through its length between an attachment end and an ear interfacing end, opposite from the attachment end, the deformable ear tip comprising:

an inner ear tip wall extending between the ear interfacing end and the attachment end;

a deformable outer ear tip wall sized and shaped to be inserted into an ear canal and extending from the ear interfacing end toward the attachment end of the ear tip; and an anchor disposed between the inner ear tip wall and the outer ear tip wall, the anchor configured to, when the ear tip is inserted into the ear canal, generate a force in a direction of the sound channel; and an alignment system that allows the deformable ear tip to be removably coupled to the device housing in a single orientation such that the anchor is positioned at a bottom portion of the ear tip when the ear tip is inserted into the ear canal of a user's ear and the force generated by the anchor counteracts moments about a pivot point created by forces exerted between the ear tip and the user's ear thereby providing a more secure fit of the ear tip within the ear canal.

12. The in-ear headphone set forth in claim 11 wherein the anchor comprises a leaf spring coupled to the inner ear tip wall.

13. The in-ear headphone set forth in claim 11 wherein the anchor comprises a rigid plastic structure co-molded with the inner ear tip wall.

14. The in-ear headphone set forth in claim 11 wherein the anchor is made from the same material as the outer ear tip wall.

15. The in-ear headphone set forth in claim 14 wherein the inner ear tip wall, outer ear tip wall and anchor are a monolithic structure.

16. The in-ear headphone set forth in claim 11 wherein the anchor is coupled to the inner ear tip wall and extends away from the inner ear tip wall toward the outer ear tip wall.

17. The in-ear headphone set forth in claim 11 wherein the anchor is coupled to the outer ear tip wall and extends away from the outer ear tip wall towards the inner ear tip wall.

* * * * *